United States Patent [19]

Pinard et al.

[11] Patent Number: 5,539,816
[45] Date of Patent: Jul. 23, 1996

[54] METHOD OF TELEPHONE SIGNALLING VIA DATA LINK

[75] Inventors: Deborah L. Pinard; Mark J. Price, both of Kanata, Canada

[73] Assignee: Mitel Corporation, Ontario, Canada

[21] Appl. No.: 330,450

[22] Filed: Oct. 28, 1994

[30] Foreign Application Priority Data

Dec. 3, 1993 [CA] Canada ................................. 2110643

[51] Int. Cl.⁶ .................................................... H04M 7/00
[52] U.S. Cl. ......................... 379/229; 379/207; 379/230; 379/258
[58] Field of Search ................................... 379/229, 230, 379/207, 201, 213, 94, 215, 258; 370/67, 110.1

[56] References Cited

U.S. PATENT DOCUMENTS

| | | | |
|---|---|---|---|
| 3,597,544 | 8/1971 | Kennedy | 379/94 |
| 4,277,649 | 7/1981 | Sheinbein | 379/215 |
| 4,499,336 | 2/1985 | Krikor et al. | 379/230 |
| 4,615,028 | 9/1986 | Lewis et al. | 370/110.1 |
| 4,616,360 | 10/1986 | Lewis | 370/67 |
| 5,259,026 | 11/1993 | Johnson | 379/213 |

*Primary Examiner*—Jeffery Hofsass
*Assistant Examiner*—Scott Wolinsky
*Attorney, Agent, or Firm*—Laff, Whitesel, Conte & Saret, Ltd.

[57] ABSTRACT

A method of processing calls in a telephone switching system which is comprised of voice trunks and a message signalling link for carrying signalling data relating to calls on the voice trunks, and a processor for controlling the switching system. The method comprises the steps of receiving an incoming signalling message on the signalling link, converting the message into signalling messages of a type recognizable by the processor as received from a voice trunk, and including a signalling trunk identification address, looking up in a table a correspondence between the signalling trunk identification address and a voice trunk identification address, passing the messages with the voice trunk identification address replacing the signalling trunk identification address to the processor, and processing the call in the switching system as if the messages had come from the voice trunk.

13 Claims, 4 Drawing Sheets

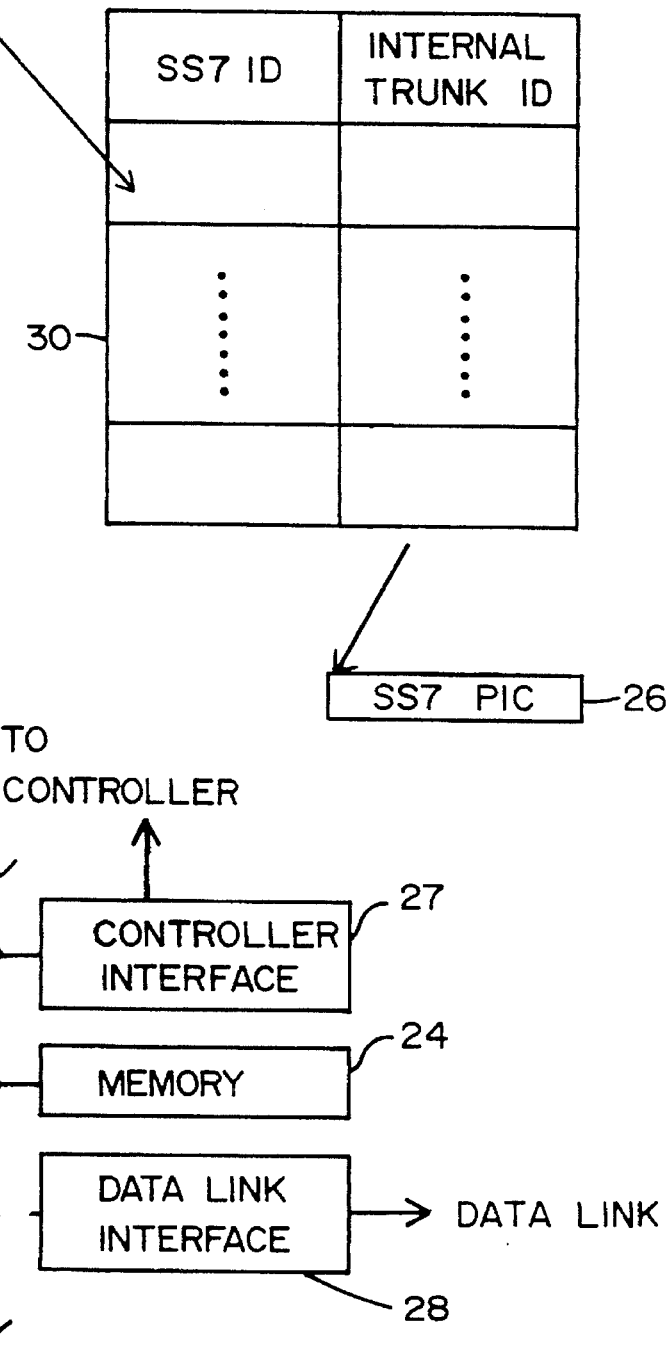

METHOD OF TELEPHONE SIGNALLING VIA DATA LINK

FIELD OF THE INVENTION

This invention relates to telephone systems, and in particular to a system and method of signalling to and receiving signalling from a remote switching office via a data link that is separate from a voice trunk.

BACKGROUND TO THE INVENTION

Telephone switching systems are linked by trunks, commonly referred to as voice trunks. Those trunks carry both signalling signals, e.g. which designate trunk seizure, destination digits, trunk release, etc., and voice signals.

Modern switching systems are being designed to deal with the considerable data that is to be transmitted between switching systems to provide new services to subscribers, such as calling station identification, roaming subscribers, etc., some of which require switching system processor to processor communication. In order to transmit the increased data between switching systems, specialized data links have been established between switching systems which are accessible to the switching system processors. These specialized and dedicated data links are much more efficient at transmitting this signalling data, since they are not required to carry analog or PCM signals, and can be optimized for digital data signals. Switching offices can make more efficient use of standard trunk circuits since the design of those trunk circuits can be restricted to and optimized for carrying analog or PCM voice signals, which are well known to have entirely different duty cycle and other characteristics than signalling data signals.

A well known standard protocol for transmitting "activity" signals via a separate data link between switching offices is referred to as SS7. Because typical messages sent using the SS7 protocol are large, e.g. 32 bytes in length, and because the data links transmit data between processors of separate switching offices, typical switching systems that can handle SS7 have a separate control shelf for interfacing the data links between the system processors. This is expensive, and requires reprogramming of the system processors.

When a data link is found to be faulty, all data carried by it is redirected to a different link. Once the faulty link is no longer faulty, traffic is usually returned to that link. It has been found difficult in prior systems to ensure that all messages that were, or were not yet transmitted on the faulty link could be transmitted on the replacement data link without any loss or repetition.

SUMMARY OF THE INVENTION

In accordance with the present invention, a separate data link that can be used for the SS7 protocol, for instance, is provided, but no reprogramming of the main system processor to accommodate a separate hardware shelf interfacing the system processor is required. Indeed, no separate hardware shelf that interfaces the system processor is used. The main switching system processor operates in a normal manner processing calls as if the activity (i.e. signalling) data had been received from a standard voice trunk.

A peripheral interface circuit is used to interface the data link to a remote switching system, which interface circuit contains a table that corresponds signalling data link addresses with voice trunk addresses. The peripheral interface circuit converts a received signalling signal from the signalling link into standard call signalling messages. The received signalling data link address associated with each message is looked up in the table, and the corresponding voice trunk address is substituted. The voice trunk address and the standard call signalling messages are sent to the switching system controller, and the controller processes the call in the normal manner, establishing a voice link via the corresponding voice trunk.

For outgoing calls, the system processor sends messages to the peripheral interface circuit as if the trunk to be used is a voice trunk, and translation to a signalling address (e.g. a SS7 trunk identification) is done in the peripheral interface circuit. The peripheral interface circuit then transmits the data via the data link identified by the signalling address to the remote switching system.

The use of standard messaging between the system processor and the peripheral interface circuit allows the use of existing hardware. This reduces the cost of equipment, since a redesign, remanufacture, installation and cost of equipment is not required either for the supplier or existing operator of the equipment. The signalling peripheral interface circuit can be retrofitted on existing equipment in the field.

Further, the peripheral interface circuit is designed so that it can redirect data from one to the other without losing data and without repetition.

In accordance with the present invention, a method of processing calls in a telephone switching system which is comprised of voice trunks and a message signalling link for carrying signalling data relating to calls on the voice trunks, and a processor for controlling the switching system, is comprised of receiving an incoming signalling message on said signalling link, converting the message into signalling messages of a type recognizable by the processor as received from a voice trunk, and including a signalling trunk identification address, looking up in a table, a correspondence between the signalling trunk identification address and a voice trunk identification address, passing the messages with the voice trunk identification address replacing the signalling trunk identification address to the processor, and processing the call in the switching system as if all messages had come from the voice trunk.

In accordance with another embodiment, a telephone switching system is comprised of a main control for controlling the processing of calls, peripheral interface circuits, a peripheral control for communicating with the main control and controlling the peripheral interface circuits, a signalling peripheral interface circuit connected between a peripheral control and a signalling link, apparatus in the signalling peripheral interface circuit for storing a table corresponding signalling trunk addresses to voice trunk addresses, apparatus in the signalling peripheral interface circuit for receiving an incoming signalling message from the signalling link, and converting the message into signalling messages of a type recognizable as received from a voice trunk, apparatus for looking up in the table a correspondence between a signalling trunk address in the incoming signalling message and a voice trunk address, and apparatus for passing the voice trunk address with the signalling messages to the main control, whereby the main control is enabled to process a call incoming on the voice trunk as if the signalling messages had been received on the voice trunk.

In accordance with another embodiment, a method of controlling the transmission of calls in a telephone switching system having voice trunks and signalling trunks, is comprised of storing in a first peripheral interface circuit messages to be sent via the signalling trunks in an array indexed by a trunk address which leads to a destination switching office to which the messages are destined, once a group of stored message relating to a particular trunk has achieved a predetermined size, formatting it into a complete signalling message and transmitting it via the signalling trunk addressed by the address to the destination switching office, storing complete signalling messages that have been transmitted in a message queue, receiving acknowledgement of receipt of transmitted signalling messages from a destination address, and erasing complete signalling messages from the message queue once an acknowledgement of a corresponding transmitted signalling message has been received.

BRIEF INTRODUCTION TO THE DRAWINGS

A better understanding of the invention will be obtained by reading the description below, with reference to the following drawings, in which:

FIG. 1 is a block diagram of a typical system utilizing an embodiment of the present invention, FIG. 2 is a block diagram of a signalling peripheral interface circuit in accordance with an embodiment of the invention, FIG. 3 is a diagram illustrating setup steps used in an embodiment of the invention, FIG. 4 is a diagram illustrating a sequence of steps used in an embodiment of the invention, and FIG. 5 is a diagram illustrating a sequence of steps used in another embodiment of the invention.

DETAILED DESCRIPTION OF THE INVENTION

Figure 1:
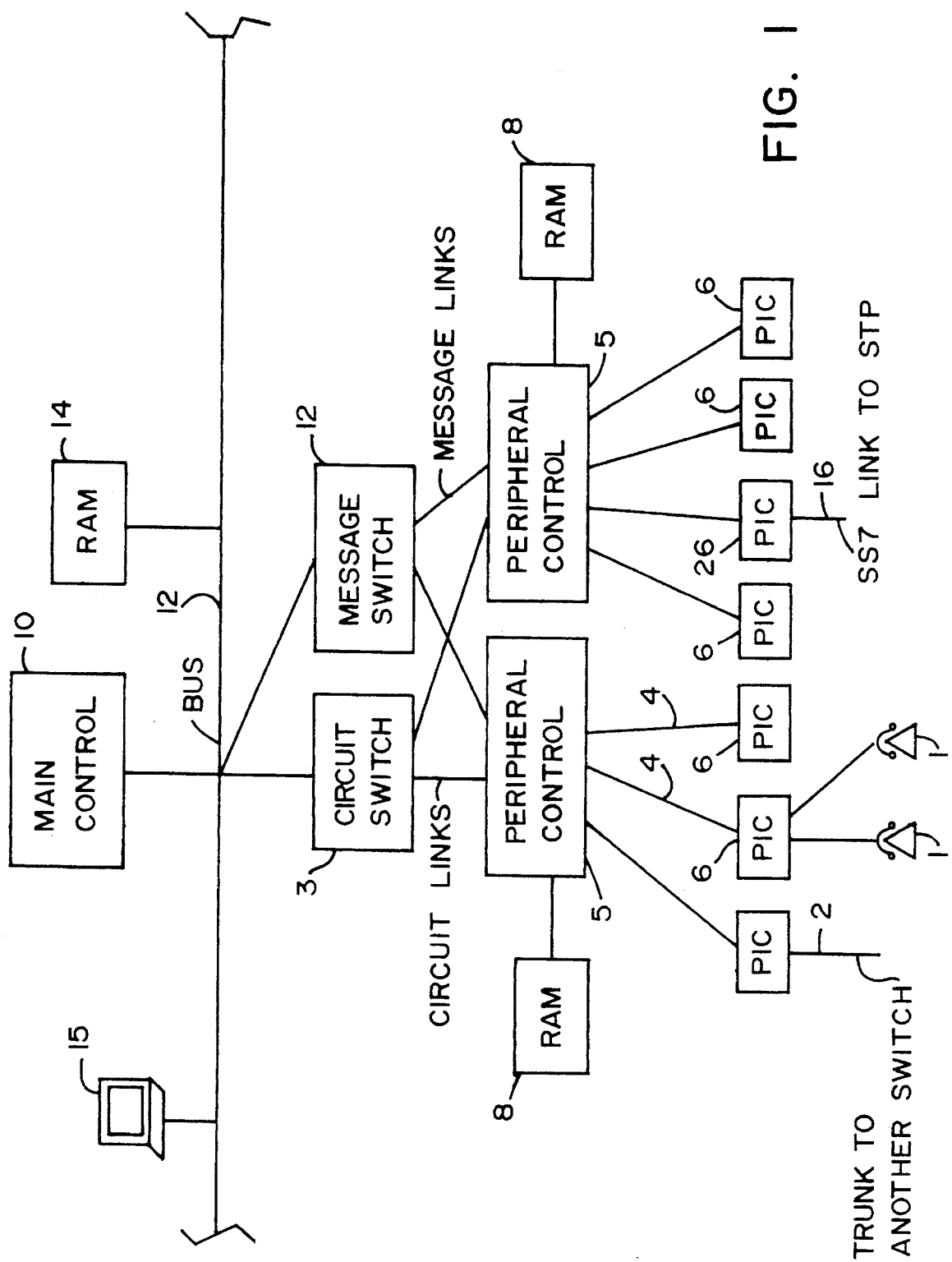

FIG. 1 is a block diagram illustrating a telephone switching system, of the type described in U.S. Pat. Nos. 4,615,028 issued September 30, 1986 and 4,616,360 issued Oct. 7, 1986 respectively, invented by Conrad Lewis and Conrad Lewis et al. It should be understood that other telephone switching systems could be used in place thereof.

In the system of FIG. 1, station sets 1 such as telephone sets are interconnected with each other and with trunks 2 via at least one circuit switch 3, telephone lines 4 connected to the station sets being switched to circuit switch links via peripheral controllers 5 which interface the telephone lines and trunks via peripheral interface circuits (PICs) 6. Random access memories (RAMs) 8 are also connected to the peripheral controllers 5, which memories store control signals for operation of the peripheral controllers.

A processor (main control) 10 is connected via a main bus 12 to the circuit switch 3, in order to control its operation. A message switch 12 is also connected to bus 12 and to peripheral controllers 5, to receive control messages from processor 10 and to route them to peripheral controllers 5, for storage in memories 8 or for transmission to telephone lines 4, destined for the station sets 1. A system memory 14, connected to bus 12, contains control programs and data used by the processor for controlling the operation of the system. An operator console 15 is connected to the main bus 12, which is used to configure and test the system when required.

One or plural data links 16 connect the telephone switching system to a signalling transfer point (STP) as may be included in a remote telephone switching system, as do trunks 2. In accordance with the present invention, data link 16 interfaces a signalling peripheral interface circuit 26, which is connected in a manner similar to peripheral interface circuits (PICs) 6 to a peripheral controller 5.

With reference to FIG. 2, PIC 26 contains a processor 20 connected to a bus 22. Memory 24 is also connected to bus 22, as well as a peripheral controller interface 27 and a data link interface 28. Controller interface 27 is connected to peripheral controller 5, and sends and receives signals to and from it as described in the aforenoted Lewis and Lewis et al patents. Data link interface 28 is connected to data link 16 in a well known manner.

In a preliminary sequence of steps, console 15 (FIG. 1) is used to establish a signalling trunk identification address vs voice trunk identification address table 30. This sequence is shown in FIG. 3. Data is entered in a form (referenced as table 30) displayed on the console, to list correspondence between the internal trunk identifications and the signalling trunk (e.g. SS7) identifications. It is useful to provide a list of internal trunk identifications already stored in RAM 14 in e.g. the right hand column, and allow the operator to insert the corresponding signalling trunk identification addresses in the left hand column. The table is stored in RAM 14, and is then downloaded via message switch 12 and peripheral controller 5 to PIC 26. PIC 26 stores the table in its memory 24, for access by processor 20.

Figure 4:
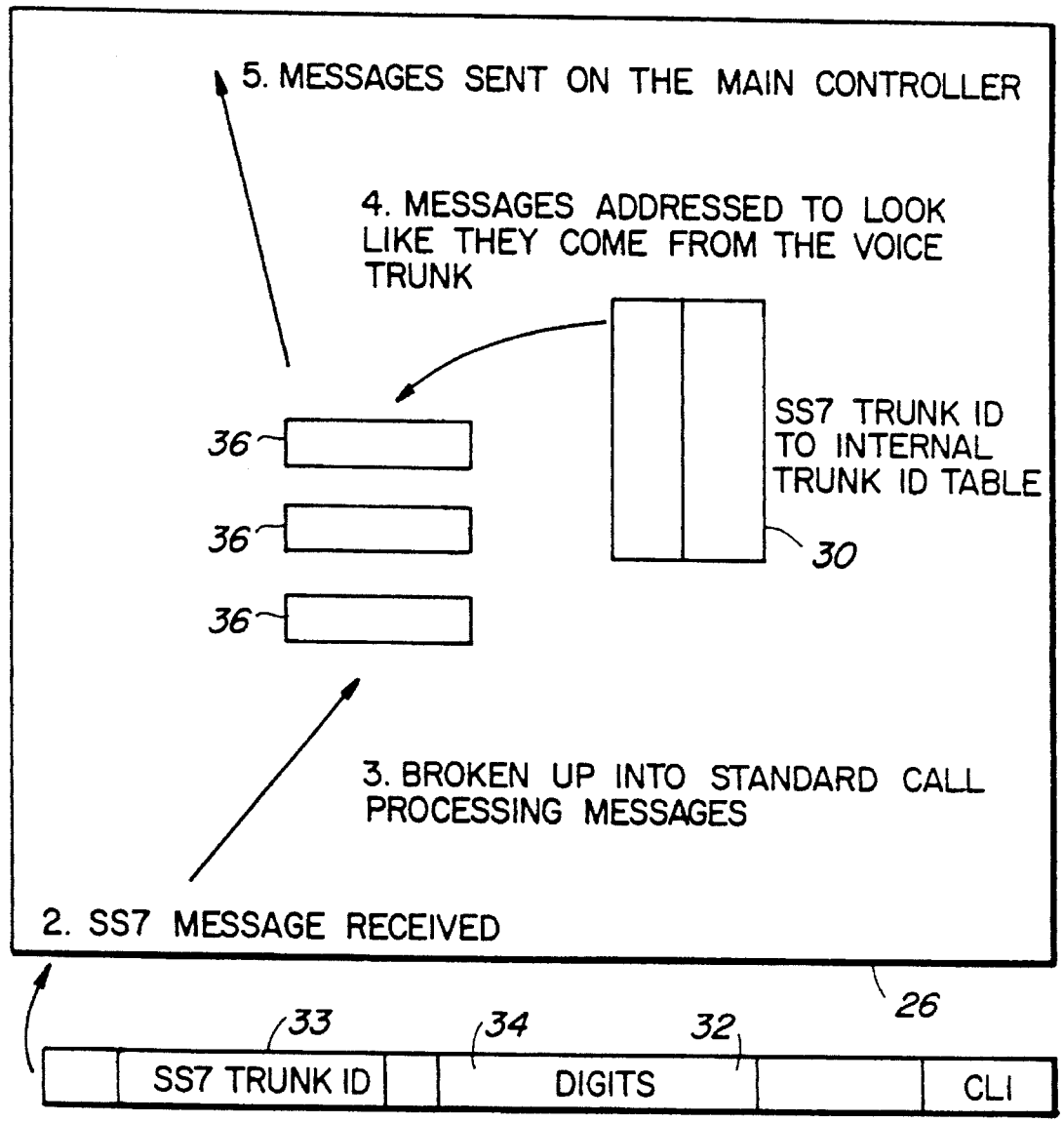

FIG. 4 illustrates a sequence of steps in which signals are received. An incoming message on data link 16 is typically in the form shown as message signal 32, and is comprised of, in the SS7 protocol, an SS7 trunk identification 33, digits 34 designating the local telephone destination for the call, etc. The message signal is received on link 16 (FIG. 2), and is applied to bus 22 for temporary storage in memory 24. Under control of processor 24, the message is divided up or otherwise converted into standard call processing messages 36, such as the trunk identification, the called digits, etc. Under control of processor 24 the table 30 in memory 24 is accessed and the SS7 trunk identification is replaced with the internal (voice) trunk identification. The standard messages are of the type normally received from a voice trunk.

The standard call processing messages 36, with the SS7 trunk identification having been replaced by a corresponding internal (voice type) trunk identification, is then transmitted via controller interface 27, peripheral controller 5, message switch 12 and bus 12 to the main control 10, where the messages are processed as if the call had come from a standard voice trunk. The subscribers line designated by the digits received in the SS7 message is then rung, and the voice trunk corresponding to the SS7 trunk identification that was listed in the table is connected to the subscribers line in the normal manner.

For messages to be sent out via data link 16, for a call being initiated to another switching office, the signals are treated in the reverse manner to that described above. Standard messages are passed from the main control to the PIC 26, where they are received via interface 27, and are temporarily stored in memory 24. Under control of processor 20, table 30 is looked up to find the corresponding SS7 trunk to the voice trunk designated in one of the messages 36, over which the processor 10 had indicated the call should be sent. Processor 20 assembles the messages into SS7 protocol, substituting the SS7 trunk identification in place of the voice trunk identification, and causes the assembled message to be transmitted on data link 16 via interface 28, to a remote switching office. The voice trunk is also siezed in the normal manner.

Figure 5:
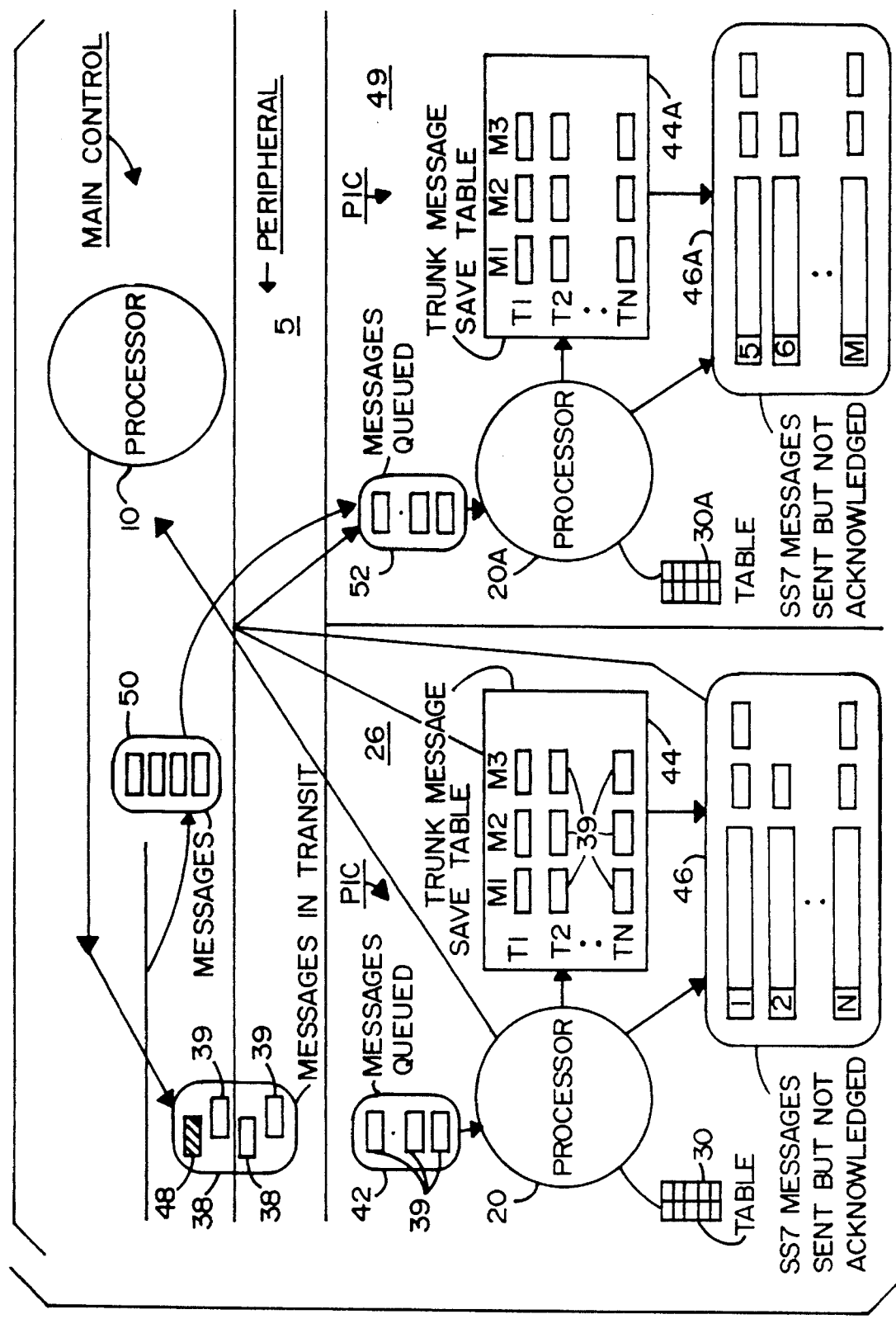

FIG. 5 shows the processing of messages in PIC 26 which will be described in more detail below, as well as the process of switching messages to a different link in the event of fault of an active data link.

The main control 10 passes messages 38 to PIC 26. Messages that are in transit to the PIC are shown as reference numeral 39. These messages, once received in PIC 26, can be formatted and transmitted immediately.

Once received in PIC 26, they are stored temporarily in a queue 42 in memory 24. In the case of need for immediate transmittal, the voice trunk identification for each message 39 stored in queue 42 is looked up in table 30, the corresponding SS7 trunk identification is retrieved, and an SS7 message is formatted and sent via interface 28 and data link 16 to a remote switching office using the SS7 trunk identification instead of the voice trunk identification.

In case messages are to be grouped, they are stored in a queue 42 in memory 24 as described above. Processor 20 then stores them in a table 44, with messages 39 (M1 . . . Mn) that are designated for particular trunk identifications T1 . . . Tn being indexed with those voice trunk identifications T1 . . . Tn. Once there are enough messages stored in the table 44 in association with a particular trunk identification for transmittal in a predetermined size message, or in accordance with some other criterion, table 30 is consulted to obtain the SS7 trunk identification for the corresponding voice trunk, the SS7 message is formatted, and the SS7 message is transmitted via interface 28 and data link 16.

As an alternative, the SS7 trunk identification can be looked up as messages arrive from processor 10, and are stored in table 44 in association with an SS7 trunk identification rather than a voice trunk identification, which will save some SS7 protocol message assembly time when the SS7 protocol message is formatted.

It will be recognized that the trunk identification stored in table 44 can be merely a pointer to a table 30 entry, if desired.

When the assembled messages in SS7 format are transmitted, each message is stored in another table 46. In accordance with the preferred process, which is incorporated into the SS7 protocol, the correct receipt of each message is acknowledged via data link 16 by the remote switching office that receives the SS7 message. When the acknowledgement has been received, the particular message that has been received is deleted from table 46. Table 46 thus constitutes a table of assembled, transmitted but not acknowledged messages sent via link 16.

Now assume that data link 16 becomes faulty. This is recognized by the main processor 10 in a well known manner (e.g. by determining that too many transmitted data errors have occurred within a predetermined time interval). Processor 10 then sends a changeover message 48 to PIC 26 that includes a designation to peripheral control 5 of which substitute data link (e.g. connected to PIC 49) is to carry new traffic, making sure that the changeover message is sent directly, without buffering. The changeover message also designates the sequence number of the last message that has been acknowledged by the remote switching office.

The processor 10 also sends all subsequent messages 50 following the changeover message to the newly designated PIC 49., where they are stored in a queue 52, in a similar manner as in queue 42 of PIC 26. By the time PIC 26 receives the changeover message, all messages that were in transit or queued when the changeover occurred will have been received by PIC 26 and processed.

The unacknowledged messages in table 46 of PIC 26 can be set to "acknowledged" (i.e. thrown away) up to the sequence number received in the changeover address. However, all messages stored in table 44 which have a destination point code which translates to a route set that has an alternative link e.g. to PIC 49 are sent via peripheral control 5 to PIC 49, where they are temporarily stored in queue 52.

If desired, rather than setting all messages in table 46 to "acknowledged", they (or if desired, messages of particular length) can be sent to PIC 49 via peripheral 5, and then marked as acknowledged in PIC 26 table 46.

Once all messages from PIC 26 have been sent to PIC 49, a message should be sent by it to processor 10 confirming that they have been sent.

With messages being stored in queue 52 in PIC 49, PIC 49 processes them in a similar manner as described above with respect to PIC 26, the corresponding processor 20 being designated by 20A, table 44 as 44A, table 46 as table 46A, and table 30 as 30A.

In the above-described manner, messages that are to be transmitted are not lost, and are not repeated.

When PIC 26 is restored from being faulty, rather than routing the data messages in process back to PIC 26 as described above, new messages can simply be sent by processor 10 to PIC 26, allowing PIC 49 to transmit all of its messages in process, and allowing PIC 26 to deal with new messages as they are received by it.

It should be recognized that messages could be moved from one PIC to multiple PICs, rather than only to a single PIC as in the embodiment described above. Since the destination is stored in the queue, in the signalling link selector (SLS) which is part of the protocol, this directs which PIC or multiple PIC to which the message is moved.

A person skilled in the art having read this specification may now design variations and other embodiments using the principles described herein. All are considered to be within the scope of this invention as defined in the claims appended hereto.

We claim:

1. A method of processing calls in a telephone switching system which is comprised of voice trunks and a message signalling link for carrying signalling data relating to calls on the voice trunks, and a processor for controlling the switching system, comprising the steps of:

a) receiving an incoming signalling message on said signalling link, b) converting said message into signalling messages of a type recognizable by the processor as received from a voice trunk, and including a signalling trunk address, c) looking up in a table, a correspondence between said signalling trunk address and a voice trunk identification address, d) passing said messages with the voice trunk identification address replacing the signalling trunk address to the processor, and e) processing the call in the switching system as if said messages had come from the voice trunk.

2. A method as defined in claim 1, further comprising the steps of:

a) storing in a first peripheral interface circuit messages to be sent via the signalling trunks in an array arranged by trunk addresses which define a destination switching office to which the messages are destined, b) once a group of stored messages relating to a particular trunk has achieved a predetermined size, formatting the group into a complete signalling message and transmitting it via the signalling trunk addressed by said signalling trunk address to said destination switching office, c) storing complete signalling messages that have been transmitted in a message queue, d) receiving acknowledgement of receipt of transmitted signalling messages from a destination switching office, and e) erasing complete signalling messages from the message queue once an acknowledgement of a corresponding transmitted signalling message has been received.

3. A telephone switching system comprising:

a) a main control for controlling the processing of calls, b) peripheral interface circuits, c) a peripheral control for communicating with the main control and controlling the peripheral interface circuits, d) a signalling peripheral interface circuit connected between a peripheral control and a signalling link, e) means in the signalling peripheral interface circuit for storing a table comprising signalling trunk addresses and corresponding voice trunk addresses, f) means in the signalling peripheral interface circuit for receiving an incoming signalling message from the signalling link, and converting the message into signalling messages of a type reconizable as received from a voice trunk, g) means for looking up in said table a correspondence between a signalling trunk address in said incoming signalling message and a voice trunk address, and h) means for passing said voice trunk address with said signalling messages to the main control, whereby the main control is enabled to process a call incoming on the voice trunk as if said signalling messages had been received on the voice trunk.

4. A method of controlling the transmission of calls in a telephone switching system having voice trunks and signalling trunks, comprising the steps of:

a) storing in a first peripheral interface circuit messages to be sent via the signalling trunks in an array arranged by trunk addresses which define a destination switching system to which the messages are destined, b) once a group of stored messages relating to a particular trunk has achieved a predetermined size, formatting the group into a complete signalling message and transmitting it via the signalling trunk addressed by a signalling trunk address to said destination switching system, c) storing complete signalling messages that have been transmitted in a message queue, d) receiving acknowledgement of receipt of transmitted signalling messages from a destination switching system, and e) erasing complete signalling messages from the message queue once an acknowledgement of a corresponding transmitted signalling message has been received.

5. A method as defined in claim 4, further comprising the steps of:

f) receiving said messages to be sent and storing them in a prestorage queue prior to storing them in said array, g) receiving an interruption message in the peripheral interface circuit that includes information that a different peripheral interface circuit will be taking over transmission from the first peripheral interface circuit, h) storing the messages in the prestorage queue immediately preceding the interruption message in said array, i) transmitting all messages contained in said array that have a destination address that can be linked to said different peripheral control circuit, to said different peripheral control circuit, and storing them in an array therein, j) storing said messages to be sent following the interruption messages in a prestorage queue of said different peripheral interface, then storing them into said array in said different peripheral interface, arranged by signalling trunk addresses which define a destination switching office to which the messages are destined, and k) once a group of stored messages relating to a particular trunk has achieved a predetermined size, formatting it into a complete signalling message and transmitting it via the signalling trunk, addressed by said signalling trunk address to said destination switching system.

6. A method as defined in claim 5, wherein said different peripheral interface circuit of step g) carries out the steps of:

g1) storing complete signalling messages that have been transmitted in a message queue, g2) receiving acknowledgement of receipt of transmitted signalling messages from a destination switching system, and g3) erasing complete signalling messages from the message queue once an acknowledgement of a corresponding transmitted signalling message has been received.

7. A method as defined in claim 5, in which the array is arranged by voice trunk addresses, and further comprising the steps of storing in the peripheral interface circuit a table comprising voice trunk addresses and corresponding signalling trunk addresses, receiving said messages to be sent containing reference to said voice trunk addresses and storing them in the array, looking up in said table signalling trunk addresses corresponding to voice trunk addresses, and using the signalling trunk addresses therein to transmit the complete signalling messages on the signalling trunk.

8. A method as defined in claim 5, in which the array is arranged by signalling trunk addresses, and further comprising the steps of storing in the peripheral interface circuit a table comprising voice trunk addresses and corresponding signalling trunk addresses, receiving said messages to be sent containing reference to said voice trunk addresses, looking up in said table signalling trunk addresses corresponding to voice trunk addresses, and storing the corresponding messages in the array arranged by said signalling trunk addresses, using the signalling trunk addresses to transmit the complete signalling messages in the signalling trunk.

9. A method as defined in claim 5, in which said interruption message includes information that plural peripheral interface circuits will be taking over transmission from the first peripheral interface circuit, and transmitting said message to plural destination addresses that can be linked to said plural interface circuits for storage therein.

10. A method as defined in claim 4, in which the array is arranged by voice trunk addresses, and further comprising the steps of storing in the peripheral interface circuit a table comprising voice trunk addresses and corresponding signalling trunk addresses, receiving said messages to be sent containing reference to said voice trunk addresses and storing them in the array, looking up in said table signalling trunk addresses corresponding to voice trunk addresses, and using the signalling trunk addresses therein to transmit complete signalling messages on the signalling trunk.

11. A method as defined in claim 10 in which the trunk addresses in the array are pointers to trunk addresses in said table.

12. A method as defined in claim 4, in which the array is arranged by signalling trunk addresses, and further comprising the steps of storing in the peripheral interface circuit a table comprising voice trunk addresses and corresponding signalling trunk addresses, receiving said messages to be sent containing reference to said voice trunk addresses, looking up in said table signalling trunk addresses corresponding to voice trunk addresses, storing the corresponding messages in the array arranged by said signalling trunk addresses, and using a signalling trunk address to transmit a complete signalling message via the signalling trunk.

13. A method as defined in claim 12 in which the trunk addresses in the array are pointers to trunk addresses in said table.

* * * * *